United States Patent Office 3,600,287
Patented Aug. 17, 1971

3,600,287
HYDROXYLATION OF AROMATIC COMPOUNDS
Stephen N. Massie, Palatine, Ill., assignor to Universal Oil Products Company, Des Plaines, Ill.
No Drawing. Filed Oct. 25, 1968, Ser. No. 770,817
Int. Cl. B01j 1/10
U.S. Cl. 204—158R                                10 Claims

ABSTRACT OF THE DISCLOSURE

Aromatic compounds are hydroxylated by reacting an excess of aromatic compounds with hydrogen peroxide in the absence of any added water by subjecting the two components to the emission of a light source having a wave length less than 3500 A.

BACKGROUND OF THE INVENTION

Heretofore, aromatic compounds have been subjected to hydroxylation by treating the aromatic compounds with hydrogen peroxide in the presence of an added amount of water above that which is present in the aqueous solution of the hydrogen peroxide. In addition, the prior art has also used an excess of hydrogen peroxide over the amount of aromatic compound which is to be subjected to hydroxylation.

The present invention is concerned with a process for the hydroxylation of aromatic compounds utilizing hydrogen peroxide as the hydroxylating agent, said reaction being effected by subjecting a mixture of the reactants to the emission of a light source having a wave length less than 3500 A. More specifically, the invention is concerned with a process for hydroxylating aromatic compounds with hydrogen peroxide in the absence of any added extraneous solvents such as water.

As hereinbefore set forth, the prior art has effected the hydroxylation of aromatic compounds with hydrogen peroxide by using an excess of hydrogen peroxide, said reaction being effected in the presence of a solvent such as water. In contradistinction to this process, it has now been discovered that aromatic compounds may be reacted with a hydrogen peroxide solution in the absence of any added solvent by subjecting the mixture to the emission of a light source having a wave length of about 2537 A. By utilizing an excess of the aromatic compound to be hydroxylated and effecting the reaction in the absence of any added extraneous solvent such as water, it is possible to obtain higher yields of the desired hydroxylated aromatic compound and, in addition, provide a commercial process for the preparation of the desired products which is more attractive to operate in an economical manner whereby, as hereinbefore set forth, greater yields of the desired product may be obtained in a less expensive manner. The less expensive method of operating the present process is due to the fact that a more efficient use of hydrogen peroxide which is more costly per mole than many of the aromatic compounds occurs as well as omitting the step of solvent extraction which would be necessary to isolate the desired product. For example, when the desired products comprise catechol and hydroquinone, the amount of water which is present when utilizing the prior art will necessitate a solvent extraction step in order to isolate the desired product, said solvent extraction step being expensive and of low efficiency inasmuch as the desired products comprising catechol and hydroquinone are very soluble in water.

It is therefore an object of this invention to provide a process for the efficient and inexpensive preparation of hydroxylated aromatic compounds.

Another object of this invention is found in a process for the preparation of hydroxylated aromatic compounds which eliminates the necessity of costly separation and extractions steps in order to obtain the desired product in a relatively high yield and/or relatively high purity.

In one aspect, an embodiment of this invention resides in a process for the hydroxylation of an aromatic compound which comprises reacting an excess of said aromatic compound with a hydrogen peroxide solution by subjecting said aromatic compound and hydrogen peroxide to the emission from a light source having a wave length less than 3500 A., in the absence of added water, and recovering the resultant hydroxylated aromatic compound.

A specific embodiment of this invention is found in a process for the preparation of phenol which comprises reacting an excess of phenol with a hydrogen peroxide solution by subjecting said phenol and hydrogen peroxide to a light source having a wave length less than 3500 A., in the absence of added water, and recovering the resultant catechol and hydroquinone.

Other objects and embodiments will be found in the following further detailed description of the present invention.

As hereinbefore set forth, the present invention is concerned with a process for the hydroxylation of aromatic compounds whereby the desired product may be obtained in an increased yield as well as in a form of the reaction mixture whereby the hydroxylated aromatic compound which comprises the desired product may be separated from the reaction mixture more easily than has been accomplished by utilizing the method set forth in the prior art. The hydroxylation is effected by reacting an aromatic compound of the type hereinafter set forth in greater detail with hydrogen peroxide in the presence of an ultra-violet irradiation source and in the absence of any added water, said aromatic compound being present in a molar excess over the hydrogen peroxide. The reaction is effected at temperatures which may be referred to generally as hydroxylation conditions. These conditions will include temperatures ranging from about −10° up to about 100° C. or more, and preferably at a temperature of about 20° to about 40° C. The hydroxylation conditions will also include a reaction pressure which preferably is atmospheric. However, if so desired, somewhat higher pressures ranging from 2 to about 50 atmospheres may be used, the pressure being that which is necessary to maintain a substantial portion of the reactants in the liquid phase. If these superatmospheric pressures are to be employed, the pressures are provided for by the introduction of a substantially inert gas such as nitrogen into the reaction zone. In addition, as hereinbefore set forth, the aromatic compound is present in a molar excess over that of the hydrogen peroxide, said aromatic compound being present in an amount in the range of from about 2:1 to about 10:1 or more moles of aromatic compound per mole of hydrogen peroxide. By utilizing this excess of aromatic compound over the hydrogen peroxide, it is possible to obtain a reaction product consisting primarily of the aromatic compound and the hydroxylated aromatic compound. In addition, this will also enable the process to be effected in a more inexpensive manner and therefore be more commercially attractive to operate inasmuch as the hydrogen peroxide is more expensive per mole than are most of the aromatic compounds. Even so, the use of an excess of the aromatic compound does not necessarily imply that the aromatic compound will be consumed less efficiently than when hydrogen peroxide was present in excess.

The present invention will be used for preparing useful compositions of matter including compounds in which at least one hydroxyl substituent is introduced on the ring of an aromatic compound. The starting materials which may be utilized in the process of this invention comprises aromatic hydrocarbons and derivatives thereof. The term "aromatic compound" as used in the present specification and appended claims will refer to these hydrocarbons and derivatives thereof and will include in particular the alkylated aromatic compounds such as toluene, o-xylene, m-xylene, p-xylene, ethylbenzene, cumene (isopropylbenzene), n-propylbenzene, n-butylbenzene, t-butylbenzene, cyclohexylbenzene, 1-methylnaphthalene, 2-methylnaphthalene, 1-ethylnaphthalene, 2-ethylnaphthalene, 1,2-dimethylnaphthalene, 1,2-diethylnaphthalene, methylbiphenyl, ethylbiphenyl, etc.; hydroxy-substituted aromatic compounds such as phenol, hydroquinone, catechol, resorcinol, 1-hydroxy-naphthalene, 2-hydroxynaphthalene, 1,2-dihydroxynaphthalene, etc.; alkyl alkoxy aromatic compounds such as m-methylphenetol, o-methylphenetol, p-methylphenetol, etc.; aroxy-substituted aromatic compounds such as diphenyl ether, etc., o-cresol, m-cresol, p-cresol, etc.; alkoxy-substituted aromatic compounds such as anisole, phenetol, n-propoxybenzene, o-methylanisole, m-methylanisole, p-methylanisole, p-ethylanisole, m-ethylanisole, etc. In addition, it is also contemplated within the scope of this invention that halogenated aromatic hydrocarbons or other halogen-containing aromatic compounds such as o-chlorotoluene, m-chlorotoluene, p-chlorotoluene, o-bromotoluene, m-bromotoluene, p-bromotoluene, o-chloroethylbenzene, m-chloroethylbenzene, 2-chloro - 1 - methylnaphthalene, 2-bromo - 1 - methylnaphthalene, 4-chloro-1-methylnaphthalene, 4-bromo - 1 - methylnaphthalene, 2-chloro - 1 - ethylnaphthalene, 4 - bromo - 1 - ethylnaphthalene, etc., 2-chlorophenol, 5-chloro - 1 - naphthol, etc., may also be used. In addition, carbohydrate derivatives of aromatic compounds such as 1,1 - diphenyl-1-desoxy-D-glucitol, 1,1-ditolyl - 1 - desoxy-D-glucitol, 1,1-bis(p-isopropylphenyl)-1-desoxy-D-glucitol, 1,1 - bis(p-methoxyphenyl) - 1 - desoxy-D-glucitol, 1,1 - bis(p-hydroxyphenyl) - 1 - desoxy-D-glucitol, the corresponding aromatic derivatives of other hexoses (fructose, sorbose, tagatose, psicose, idose, gluose, talose), glycolaldehyde, trioses, tetraoses, pentaoses, etc., may also be used. It is to be understood that the aforementioned compounds are only representative of the type of aromatic compounds and derivatives thereof which may be used as starting materials in the process of this invention and said invention is not necessarily limited thereto. In general, it is contemplated that the utilizable aromatic derivatives may be represented by the following generic formula:

$$R_mArX_n$$

in which Ar is a monocyclic or polycyclic aromatic hydrocarbon nucleus, R is independently selected from the group consisting of alkyl, cycloalkyl, hydroxyl, alkoxy and hydroxyalkyl radicals, X is independently selected from the group consisting of hydrogen, and halogen and carbohydrate substituents, while $m$ and $n$ are integers of at least 1. In general, unsubstituted aromatic hydrocarbons such as benzene, naphthalene, etc., may also be reacted according to the process herein set forth, although not necessarily with equivalent results.

The aforementioned aromatic compounds are reacted with a hydrogen peroxide solution which will contain from about 30% to about 95% hydrogen peroxide concentration, the remainder of the solution being water. However, as hereinbefore set forth, the reaction is effected in the absence of any added water and the water which results from the usage of the hydrogen peroxide may be removed by azeotroping away said water, thereby allowing the recovery of a dry hydroxylated-aromatic mixture which may be distilled without an additional solvent extraction step in order to obtain the desired product.

The reaction is effected by irradiating the aromatic compound-hydrogen peroxide mixture with a light source which possesses a wave length less than about 4000 A., and preferably less than 3500 A. One particular light source which may be utilized to effect the process of the present invention comprises a medium pressure mercury arc lamp. These lamps usually contain a specific amount of mercury vapor and a large amount of a rare gas, the total pressure being above atmospheric. These mercury arc lamps possess strong emission lines at 2537 A., 2900 A., and 3660 A., among others. It is also contemplated that a low pressure mercury arc lamp which contains a small amount of mercury vapor and a larger amount of a rare gas, said lamp having a total pressure less than atmospheric may also be used. In addition, another light source which may be utilized to effect the photosensitized hydroxylation of the present invention comprises a specifically prepared fluorescent light which will also emit energy at a desired wave length, that is, a large portion of wave lengths no greater than 3700 A. In addition, if so desired, it is also contemplated that the process may be effected in the presence of conventional sensitizers which may be used to effect a rapid reaction. These sensitizers which may be used comprise organic compounds containing oxy substituents such as ketones which will include such compounds as acetone, methylethyl ketone, diethyl ketone, ethylpropyl ketone, dipropyl ketone, propylbutyl ketone, acetophenone, ethylbenzyl ketone, propylphenyl ketone, benzophenone (diphenyl ketone), etc.

The process of this invention may be effected in any suitable manner and may comprise either a batch or continuous type operation. When utilizing a batch type operation, a quantity of the aromatic compound and the hydrogen peroxide, in a mole ratio hereinbefore set forth, along with the sensitizers, if so desired, are placed in an appropriate apparatus. This apparatus may comprise a quartz reactor or a glass reactor, depending upon the wave length of the irradiation emission source. In addition, it is also contemplated within the scope of this invention that a reactor made of a synthetic material known in the trade as Vycor may also be used. The resulting solution or emulsion is then irradiated for a predetermined residence time at hydroxylation conditions with stirring or agitation, if necessary, to maintain intimate contact of the reactants, said residence time being in a range of from about 4 to about 40 hours or more. During or after this time, any water which may be present due to the using up of the hydrogen peroxide may be azeotroped off, or in some cases, may be separated if the reactants lack of mutual solubility, through specific means provided therefor. Upon completion of the aforementioned residence time, the reaction mixture is recovered and the desired hydroxylated aromatic compound is separated from any unreacted aromatic compound and hydrogen peroxide by conventional means such as fractional distillation or in some cases, if the reactants lack mutual solubility, by physical separation.

It is also contemplated within the scope of this invention that the process described herein may be effected in a continuous manner of operation. When such a manner of operation is used, the starting materials comprising the aromatic compound and the hydrogen peroxide are continuously charged to a reaction zone comprising a quartz, glass or Vycor reactor which is maintained at the suitable operation conditions of temperature and pressure and agitated, if necessary, to maintain intimate contact if mutually insoluble reactants are used. The solution is then subjected to irradiation from a light source, hereinbefore set forth in greater detail which possesses a wave length less than 4000 A. and preferably less than 3700 A., for a predetermined residence time. Upon completion of the desired residence time, the reactor effluent is continuously withdrawn and subjected to any separation means known in the art whereby the unreacted starting materials and or side products are separated therefrom. The desired product is recovered, while the unreacted starting materials are recycled to form a portion of the feed stock.

Examples of hydroxylated aromatic compounds which may be prepared according to the process of this invention include o-hydroxytoluene (o-cresol), p-hydroxytoluene (p-cresol), 2-hydroxy-p-xylene, 4-hydroxy-o-xylene, 2-hydroxyethylbenzene (o-ethylphenol), 2,4-dihydroxyethylbenzene, 2-hydroxy-p-cymene, 2-hydroxy-1-methylnaphthalene, 2,4-dihydroxy-1-methylnaphthalene, 1-hydroxy-2-methylnaphthalene, 1,4-dihydroxy-2-methylnaphthalene, 2-hydroxy-1-methylanthracene, 2,4-dihydroxy-1-methylanthracene, catechol, hydroquinone, hydroxyhydroquinone, pyrogallol, guaiacol, 4-hydroxyanisole, 2-hydroxyphenetol, 2,4-dihydroxyanisole, 2,4-dihydroxyphenetol, 2-hydroxy-p-methylanisole, 2-hydroxy-p-ethylanisole, 2-hydroxy-o-chlorotoluene, 2-hydroxy-o-bromotoluene, 4-hydroxy-o-chlorotoluene, 4-hydroxy-o-bromotoluene, 5-hydroxy-o-chlorotoluene, 5-hydroxy-o-bromotoluene, 1,1-di-(p-hydroxyphenyl)-1-desoxy-D-glucitol, 1,1-di-(p-hydroxyphenyl)-1-desoxy-D-mannitol, etc., propylphenol, n-butylphenol, t-butylphenol, di-t-butylphenol, n-butyltoluene, di-n-butyltoluene, mono-t-butyltoluene, di-t-butyltoluene, 4,4'-isopropylidinediphenol, etc. It is to be understood that the aforementioned compounds are only representative of the type of compounds which may be prepared and that the present invention is not necessarily limited thereto.

The products comprising hydroxylated aromatic compounds which are prepared according to the process of this invention will find a wide variety of use in the chemical field. For example, hydroquinone is an important chemical which is utilized in photographic developers, in dye intermediates, in medicines, as an antioxidant for fats and oils, as an inhibitor in coating compounds for rubber, stone and textiles, in paints and varnishes, as well as in motor fuels and oils. In addition, it is also used as an intermediate for preparing mono- and di-benzyl ethers of hydroquinone, the latter compounds being used as stabilizers, antioxidants, or solvents, as well as being used in perfumes, plastics, and pharmaceuticals. Catechol, another dihydroxybenzene, finds a wide variety of use as an antiseptic, in photography, dye stuffs, antioxidants and light stabilizers. Furthermore, it is an intermediate for the preparation of dimethyl ether of catechol which is used as an antiseptic or as an intermediate for the methyl ether of catechol which is guiacol, this compound being an important component of many medicines.

Likewise, mono-hydroxybenzene or phenols, as well as cresols, are used in phenolic resins as disinfectants, flotation agents, surfactants, scouring compounds, lube oil additives, photographic developers, and as intermediates in ink, paint, and varnish removers. In addition, hydroxy-substituted aromatic carbohydrate derivatives may be used as intermediates in detergents, water-soluble pharmaceuticals, explosives, gelling agents, surface coatings, resins and oxidation inhibitors. Likewise, phenol may be reacted with di-t-butyl peroxide or acetone to form 4,4'-isopropylidenediphenol which is known in the trade as Bisphenol-A, a common component of epoxy resins.

It is also contemplated within the scope of this invention that the process may be effected in the presence of an oxygen-containing gas such as oxygen or air. The oxygen-containing gas is bubbled through the aromatic compound-hydrogen peroxide mixture while the mixture is being exposed to the irradiation from the ultra-violet light source, usually in a large excess of oxygen-containing gas per mixture. It is necessary that the oxygen-containing gas be in intimate contact with the mixture and therefore, as hereinbefore set forth, it is necessary that the gas be bubbled through the mixture rather than utilizing the same as a gaseous blanket in the reactor. Pressure greater than atmospheric and cooler temperatures may be utilized to increase the amount of oxygen dissolved in the reactant mixture.

The following examples are given to illustrate the process of the present invention which, however, are not intended to limit the generally broad scope of the present invention in strict accordance therewith.

Example I

In this example 11.3 grams (0.1 mole) of a 30% aqueous hydrogen peroxide solution was added with vigorous stirring to 94.0 grams (1.0 mole) of melted phenol. The mixture was added to a 100 cc. quartz reactor which was sealed and exposed to irradiation at 2537 A. from an ultra-violet light source. The irradiation was effected at a temperature of 30° C. for a period of 40 hours. At the end of this time, irradiation was discontinued and the reaction mixture was recovered. The mixture was analyzed by means of a gas-liquid chromatograph to determine the presence of dihydroxybenzenes and by a polarograph for residual hydrogen peroxide. It was found that 96% of the hydrogen peroxide was consumed, there being obtained a 51% yield of dihydroxybenzenes based on the amount of hydrogen peroxide charged and a 54% yield based on the amount of hydrogen peroxide consumed. The ratio of hydroquinone to catechol was 0.32.

Example II

In this example 11.3 grams (0.1 mole) of a 30% aqueous hydrogen peroxide solution is mixed vigorously with 92 grams (1.0 mole) of toluene which forms an emulsion. The emulsion is placed in a quartz reactor of 100 cc. capacity equipped with an efficient stirrer and is subjected to irradiation from a low pressure mercury arc lamp which has a strong emission line at 2537 A. Irradiation is allowed to continue for a period of 20 hours while maintaining the reactor at a temperature of 30° C. At the end of this time, the organic phase of the reaction mixture is recovered and analyzed by means of a gas-liquid chromatograph and polarograph. These analyses will disclose the presence of cresol along with unreacted toluene and unconsumed hydrogen peroxide.

Example III

In this example, 11.3 grams (0.1 mole) of a 30% aqueous hydrogen peroxide solution and 108 grams (1.0 mole) of anisole are placed in a quartz reactor equipped with an efficient stirrer and subjected to irradiation from a low pressure mercury arc lamp which has a strong emission line at 2537 A. The irradiation is continued for a period of 40 hours at a temperature of 30° C. At the end of this time, the reaction mixture is withdrawn from the reactor, the organic phase separated, dried, and thereafter analyzed by means of a gas-liquid chromatograph. This analysis will disclose the presence of hydroxyanisoles along with unreacted anisole. The bulk of the unreacted hydrogen peroxide remained in the aqueous phase and an aliquot was thereafter determined by polarograph. The unreacted hydrogen peroxide was available to be returned to the quartz reactor with the unreacted anisole.

I claim as my invention:

1. A process for the hydroxylation of an aromatic compound which comprises reacting an excess of said aromatic compound with a hydrogen peroxide solution by subjecting said aromatic compound and hydrogen peroxide to the emission from a light source having a wave length less than 3500° A., in the absence of added water, and recovering the resultant hydroxylated aromatic compound.

2. The process as set forth in claim 1 in which said aromatic compound is present in an amount in a range of from about 2:1 to about 10:1 moles or more of aromatic compound per mole of hydrogen peroxide.

3. The process as set forth in claim 1 in which the concentration of hydrogen peroxide in said solution is in a range of from about 30% to 95% hydrogen peroxide.

4. The process as set forth in claim 1 in which said aromatic compound is phenol.

5. The process as set forth in claim 1 in which said aromatic compound is toluene.

6. The process as set forth in claim 1 in which said aromatic compound is anisole.

7. The process as set forth in claim 1 in which said hydroxylated aromatic compound is hydroquinone.

8. The process as set forth in claim 1 in which said hydroxylated aromatic compound is catechol.

9. The process as set forth in claim 1 in which said hydroxylated aromatic compound is cresol.

10. The process as set forth in claim 1 in which said hydroxylated aromatic compound is hydroxyanisole.

References Cited

UNITED STATES PATENTS

| 3,182,008 | 5/1965 | Heywood et al. | 204—159.2 |
| 3,347,763 | 10/1967 | Coffey et al. | 204—158 |

OTHER REFERENCES

Anderson et al.: Journal of The American Chemical Society, vol. 45 (March 1923) pp. 650 and 660.

HOWARD S. WILLIAMS, Primary Examiner

U.S. Cl. X.R.

204—162R